US012107900B2

(12) United States Patent
Gargaro et al.

(10) Patent No.: US 12,107,900 B2
(45) Date of Patent: Oct. 1, 2024

(54) REVISION OF ACCESS CONTROL SYSTEM TRIGGERED BY POLICIES BASED ON RISKS AND/OR COUNTERMEASURES THEREOF

(71) Applicant: INTERNATIONAL BUSINESS MACHINES CORPORATION, Armonk, NY (US)

(72) Inventors: Gianluca Gargaro, Rome (IT); Raffaele Giulio Sperandeo, Marcianise (IT); Luigi Lombardi, Naples (IT); Davide Fazzone, Baiano (IT)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 17/202,442

(22) Filed: Mar. 16, 2021

(65) Prior Publication Data
US 2022/0303313 A1    Sep. 22, 2022

(51) Int. Cl.
*H04L 9/40* (2022.01)

(52) U.S. Cl.
CPC .......... *H04L 63/205* (2013.01); *H04L 63/101* (2013.01); *H04L 63/1425* (2013.01); *H04L 63/1433* (2013.01)

(58) Field of Classification Search
CPC . H04L 63/205; H04L 63/101; H04L 63/1425; H04L 63/1433
USPC .............................................................. 726/1
See application file for complete search history.

(56) References Cited

U.S. PATENT DOCUMENTS

| 8,413,211 | B2 * | 4/2013 | Tokutani | G06F 21/6218 |
| | | | | 726/2 |
| 8,681,803 | B2 * | 3/2014 | Morita | H04L 45/64 |
| | | | | 709/227 |
| 9,137,263 | B2 * | 9/2015 | Chari | H04L 63/102 |
| 9,137,265 | B2 | 9/2015 | Chari | |
| 9,154,507 | B2 | 10/2015 | Ashley | |

(Continued)

FOREIGN PATENT DOCUMENTS

| CN | 109165516 A | 1/2019 |
| CN | 113711216 A | 11/2021 |

(Continued)

OTHER PUBLICATIONS

Michael Brunner, Towards Automation in Information Security Management Systems, University of Innsbruck (Year: 2017).*

(Continued)

*Primary Examiner* — Luu T Pham
*Assistant Examiner* — Saad Ahmad Abdullah
(74) *Attorney, Agent, or Firm* — Steven M. Bouknight

(57) ABSTRACT

A solution is proposed for facilitating a maintenance of an access control system. A corresponding method comprises evaluating one or more trigger policies according to one or more policy parameters; the policy parameters of the trigger policies in part relate to risks of the access control system and/or to countermeasures for mitigating the risks. A revision of the access control system, comprising a corresponding mining activity, is triggered according to a result of the evaluation of the trigger policies. A computer program and a computer program product for performing the method are also proposed. Moreover, a system for implementing the method is proposed.

19 Claims, 9 Drawing Sheets

(56) References Cited

U.S. PATENT DOCUMENTS

| | | | |
|---|---|---|---|
| 9,584,525 | B2 | 2/2017 | Baikalov |
| 10,021,138 | B2 | 7/2018 | Gill |
| 10,139,789 | B2 * | 11/2018 | Soni .................. H04L 12/282 |
| 2004/0205342 | A1 | 10/2004 | Roegner |
| 2009/0300711 | A1 | 12/2009 | Tokutani |
| 2011/0126111 | A1 | 5/2011 | Gill |
| 2012/0246098 | A1 | 9/2012 | Chari |
| 2013/0111583 | A1 | 5/2013 | Hernandez |
| 2015/0373028 | A1 | 12/2015 | Baikalov |
| 2016/0139573 | A1 | 5/2016 | Soni |
| 2018/0234428 | A1 | 8/2018 | Braksator |
| 2019/0327271 | A1 | 10/2019 | Saxena |
| 2020/0076818 | A1 | 3/2020 | Krishnan |
| 2020/0396222 | A1 | 12/2020 | Gargaro |
| 2021/0173711 | A1 * | 6/2021 | Crabtree ............. G06F 16/9024 |
| 2021/0344718 | A1 * | 11/2021 | Raleigh ................ G06Q 40/12 |

FOREIGN PATENT DOCUMENTS

| | | | |
|---|---|---|---|
| DE | 112010004284 | T5 | 1/2013 |
| DE | 112020001688 | T5 | 2/2022 |
| EP | 1359503 | A1 | 11/2003 |
| EP | 2009865 | A1 | 12/2008 |
| GB | 2599582 | A | 4/2022 |
| JP | 2009289137 | A | 12/2009 |
| JP | 2015516610 | A | 6/2015 |
| JP | 2022536057 | A | 8/2022 |
| WO | 2013042634 | A1 | 3/2013 |
| WO | 2013128338 | A1 | 9/2013 |
| WO | 2020250103 | A1 | 12/2020 |

OTHER PUBLICATIONS

IBM: List of IBM Patents or Patent Applications Treated as Related (Appendix P), Mar. 22, 2021, 2 pages.

Bijon et al., "A Framework for Risk-Aware Role Based Access Control", 6th Symposium on Security Analytics and Automation 2013, © 2013 IEEE, pp. 462-469.

Chen et al., "Risk-Aware Role-Based Access Control", STM 2011, LNCS 7170, © Springer-Verlag Berlin Heidelberg 2012, pp. 140-156.

International Search Report and Written Opinion, International Application No. PCT/IB2020/055358, Date of Mailing Sep. 29, 2020, 7 pages.

Mell et al., "The NIST Definition of Cloud Computing", National Institute of Standards and Technology, Special Publication 800-145, Sep. 2011, pp. 1-7.

Talukdar et al., "Efficient bottom-up Mining of Attribute Based Access Control Policies", IEEE Conf Collab Internet Comput. Oct. 2017 ; 2017: 339-348.

Notice of Reasons for Refusal, Japanese Patent application No. 2021-571288, Filed on Jun. 8, 2020, Notice of refusal mailed on Dec. 5, 2023, 17 pages, Machine Translated.

* cited by examiner

REVISION OF ACCESS CONTROL SYSTEM TRIGGERED BY POLICIES BASED ON RISKS AND/OR COUNTERMEASURES THEREOF

BACKGROUND

The present disclosure relates to the information technology field. More specifically, this disclosure relates to the control of access to information technology systems.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The control of access to any information technology system is a crucial issue for its management. In general terms, this relates to a process used to restrict access to (protected) resources of the information technology system selectively (for example, programs, data and devices). Particularly, the access control process is used to permit/prohibit activities that may be performed on the resources (commonly referred to as objects) by different entities, for example, (human) users (commonly referred to as subjects). The access control process is aimed at enabling the (right) subjects to perform the (right) activities at right times and for right reasons; this avoids (or at least significantly reduces) the risk that unauthorized subjects might perform undesired (and generally dangerous) activities in the information technology system. All of the above is very important to guarantee data security and statutory law compliance.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is triggering revision of an access control system according to policies based on risks and/or corresponding countermeasures.

Particularly, an embodiment provides a method for facilitating a maintenance of an access control system. One or more trigger policies are evaluated according to one or more policy parameters; the policy parameters of the trigger policies in part relate to risks of the access control system and/or to countermeasures for mitigating the risks. A revision of the access control system, comprising a corresponding mining activity, is triggered according to a result of the evaluation of the trigger policies.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its properties, like value, content and representation).

Particularly.

DETAILED DESCRIPTION

Figure 1A:
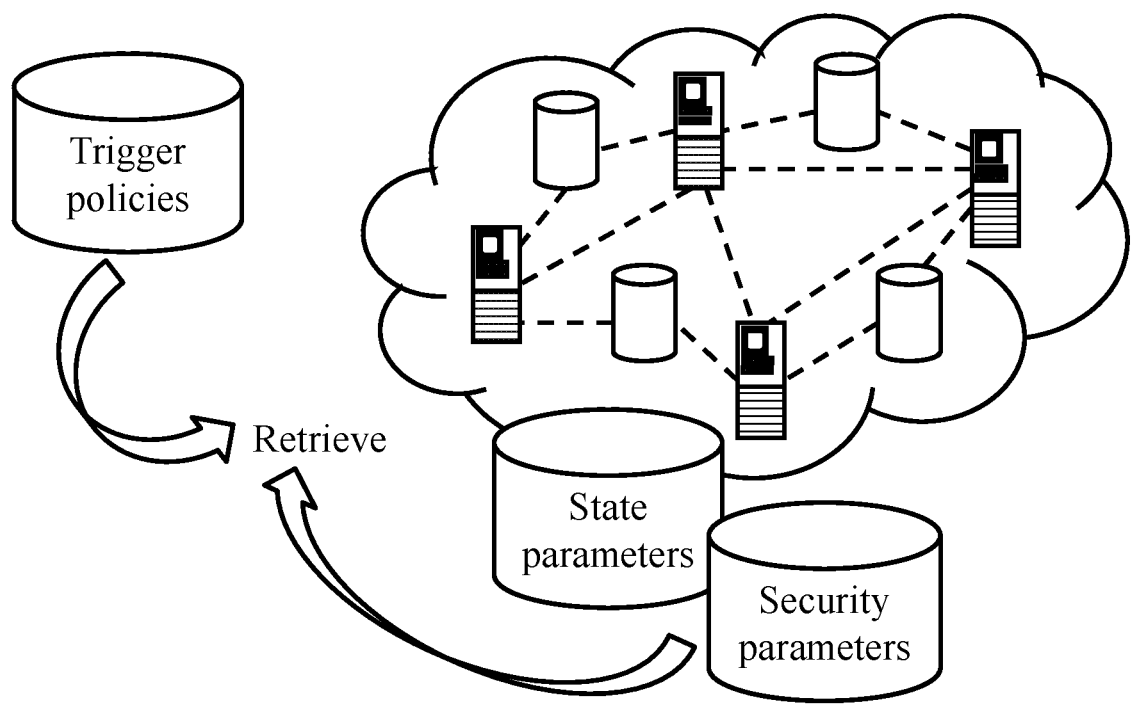
FIGS. 1A-1D show the general principles of the solution according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the information technology field. More specifically, this disclosure relates to the control of access to information technology systems. The following described exemplary embodiments provide a system, method, and program product to, among other things, facilitate maintenance of an access control system. Therefore, the present embodiment has the capacity to improve the technical field of information technology by controlling access to one or more resources of an information technology system by one or more subjects or users. The information technology system may be of any type, with any number of resources, whose access has to be controlled by any number and type of subjects.

As stated above, the control of access to any information technology system is a crucial issue for its management. In general terms, this relates to a process used to restrict access to (protected) resources of the information technology system selectively (for example, programs, data and devices). Particularly, the access control process is used to permit/prohibit activities that may be performed on the resources (commonly referred to as objects) by different entities, for example, (human) users (commonly referred to as subjects). The access control process is aimed at enabling the (right) subjects to perform the (right) activities at right times and for right reasons; this avoids (or at least significantly reduces) the risk that unauthorized subjects might perform undesired (and generally dangerous) activities in the information technology system. All of the above is very important to guarantee data security and statutory law compliance.

The access control process is implemented by a corresponding access control system, for example, based on an Identity and Access Management (IAM) application. In general, the access control system associates each subject with a digital identity used to identify the subject for operating in the information technology system (such as via account and password). The access control system then specifies any permissions of each subject to perform specific activities on specific objects (for example, reading/writing files), and enforces the access to the objects by the subjects in compliance with their permissions (such as a subject with a read permission to a file may open but not update it). The access control system may also track activities that have been performed with respect to the control access process (such as granted/denied accesses) for their auditing (such as to verify compliance with security/law requirements).

The access control system may be based on different security models. For example, the most common security model is the Role Based Access Control (RBAC) model. In this case, different roles define permissions to perform activities in the information technology system; each subject is assigned one or more roles, and then the corresponding permissions. Another promising security model is the Attribute Based Access Control (ABAC) model, also known as Policy Based Access Control (PBAC) or Claims Based Access Control (CBAC). In this case, different rules define permissions to perform activities in the information technology system according to attributes; each subject is assigned the permissions of the rules which are satisfied by the corresponding attributes.

However, the governance of the access control process is generally subject to dynamic requirements (which change with a relative high frequency); for example, this may be due to reorganization, acquisition and outsourcing operations as well as to regulatory modifications. Therefore, the access control system (and particularly corresponding access control information used to control the access to the information technology system) is continually revised in an attempt to keep it up to the actual requirements. For example, in case the access control system is based on the RBAC/ABAC model, role/rule mining techniques may be applied to discover typical patterns of subjects-to-resources mapping (which are used to change the roles/assignments or the rules accordingly). In general, the obtained result is a trade-off between the opposed requirements of complexity of the access control system (in terms of number of roles/rules) and risks for the information technology system (measured by corresponding metrics).

In any case, this (role/rule) mining activity is time consuming (especially in large organizations with thousands of resources, subjects and permissions); moreover, it requires a heavy manual intervention. All of the above makes the revision of the access control system quite expensive.

Therefore, the revision of the access control system is generally performed only in response to events that are deemed to involve significant changes; for example, this may be the case of an upheaval in an organizational chart, an incorporation of a new company, a spin-off of a business branch, a creation of a new strategy area and so on.

However, it may happen that despite some events appeared to be valid reasons for revising the access control system, the obtained results did not worth its cost; vice-versa, it may happen that events that appeared not significant instead would have required a heavy change in the access control system. In any case, even minor events which do not involve any significant change individually may do so when occurring continually over a long time.

Therefore, the determination of the right time for revising the access control system is challenging; in any case, this is a completely manual task, which is then strongly dependent on personal skills, prone to errors and scarcely reproducible. As a consequence, a risk exists of performing useless revisions of the access control system; this adversely affects a management cost of the information technology system. Conversely, a risk exists of delaying useful revisions of the access control system; this may cause data security and/or statutory law compliance exposures.

With reference in particular to FIGS. 1A-1D, the general principles are shown of the solution according to an embodiment of the present disclosure.

Starting from FIG. 1A, an access control system is implemented to control access to an information technology system, and particularly to objects, for example, resources of the information technology system by subjects, for example, users operating in the information technology system via corresponding digital identities. For this purpose, the access control system leverages corresponding access control information; particularly, in case the access control system is based on the RBAC model, the access control information indicates roles having permissions for performing activities on the resources and their assignment to the users, wherein in case the access control system is based on the ABAC model, the access control information indicates rules defining permissions to perform activities on the resources by the users when satisfied by corresponding attributes.

One or more trigger policies are provided for determining when a revision of the access control system (and particularly of its access control information) is needed. Each trigger policy is based on one or more (policy) parameters. The policy parameters of all the trigger policies include one or more state (policy) parameters relating to a (current) state of the access control system; in the solution according to an embodiment of the present disclosure, the policy parameters further include one or more security (policy) parameters relating to risks of the access control system and/or to countermeasures for mitigating the risks. Over time, for example, periodically, the trigger policies and their policy parameters are retrieved.

Figure 1B:
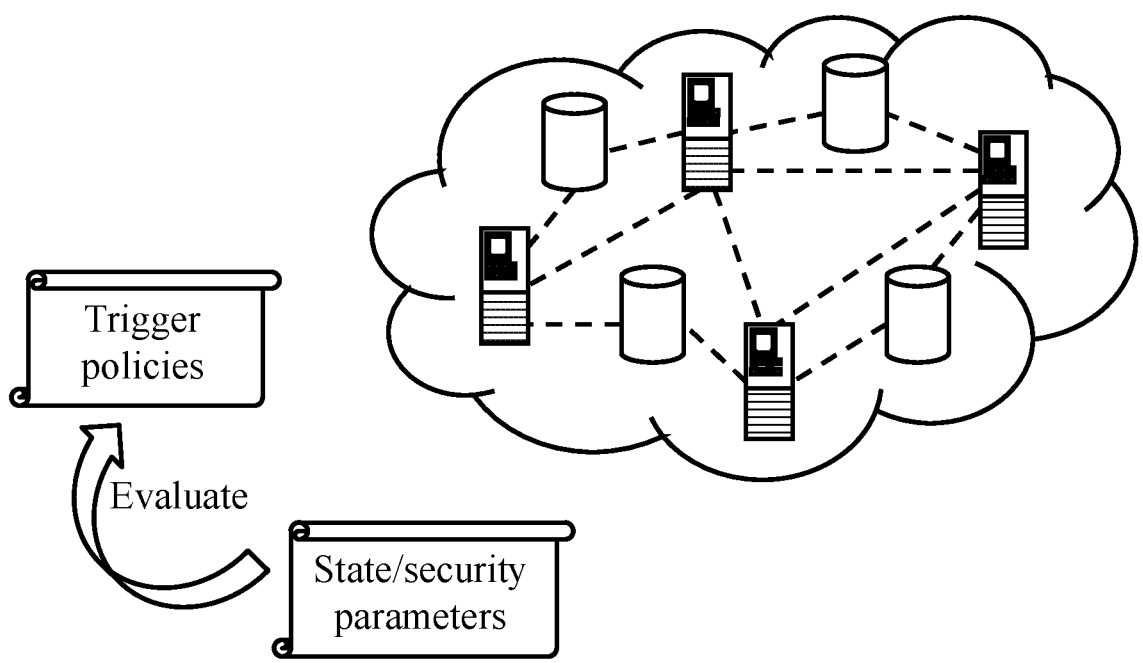

Moving to FIG. 1B, the trigger policies are evaluated according to the corresponding policy parameters; for example, each trigger policy is evaluated by determining whether it is true or false.

Figure 1C:
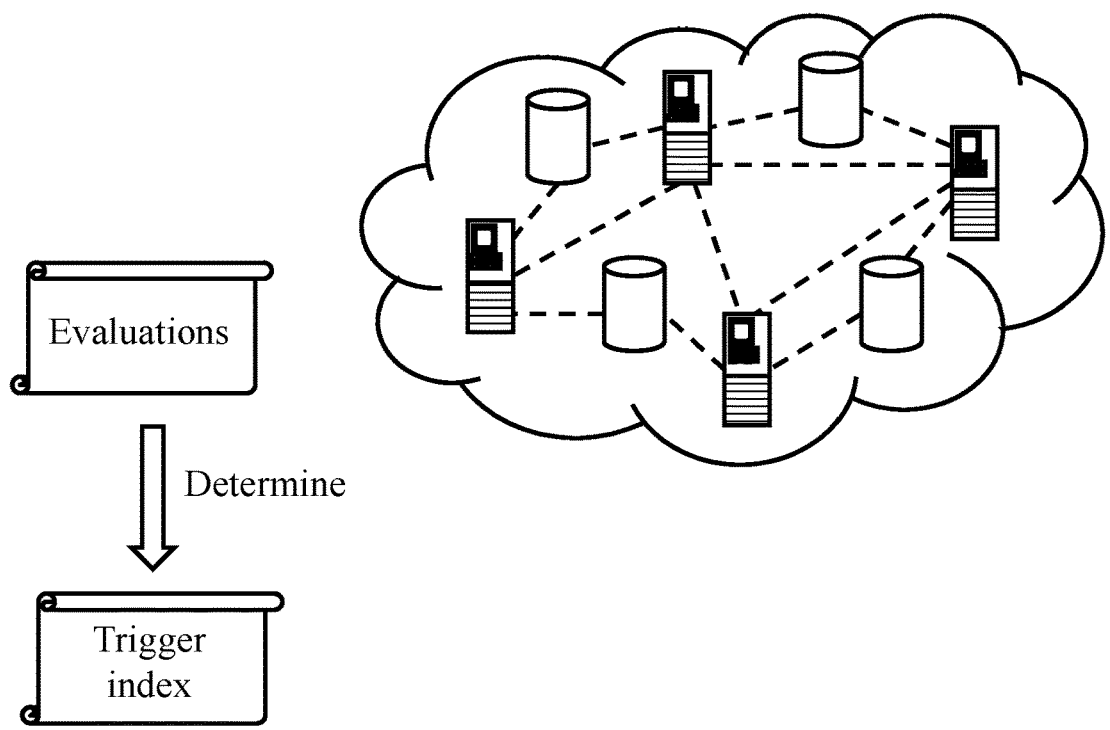

Moving to FIG. 1C, a trigger indicator is determined according to the evaluations of the trigger policies; for example, the trigger indicator is a trigger index that is calculated by weighting the trigger policies that are true according to corresponding weights (depending on their effectiveness in triggering the revision of the access control system).

Figure 1D:
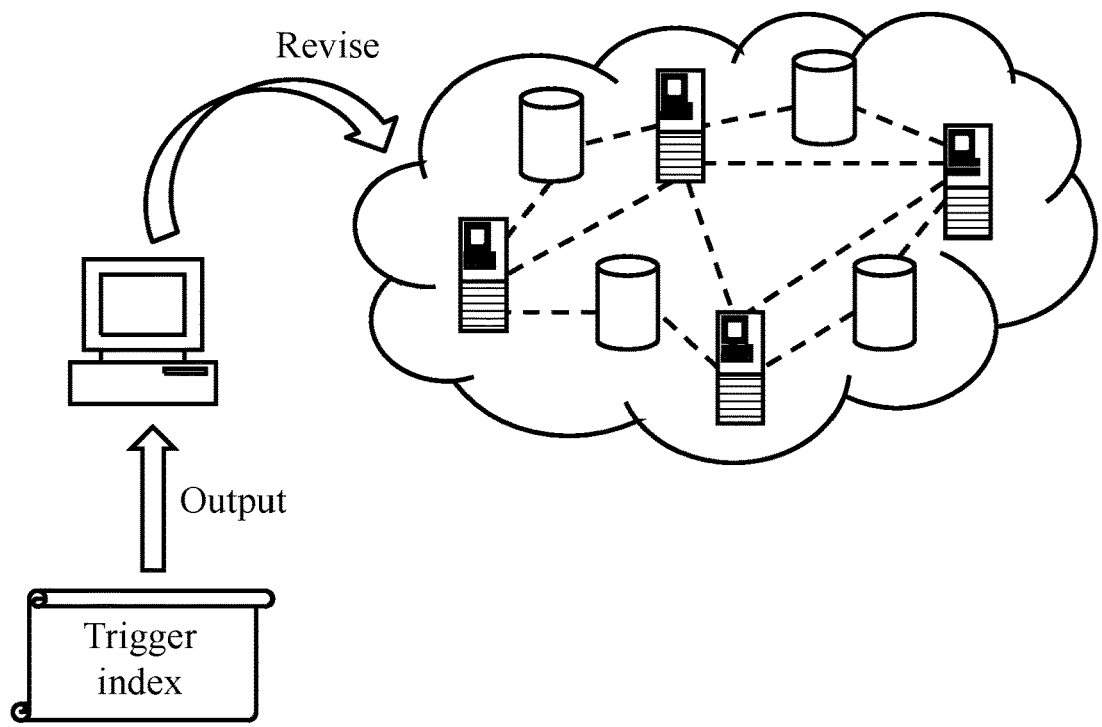

Moving to FIG. 1D, the trigger index is output (for example, displayed) so as to cause the revision of the access control system in response thereto (for example, when the trigger index exceeds a threshold); particularly, this involves a mining activity for mapping the subjects to the resources (for example, a role mining for the RBAC model or a rule mining for the ABAC model) and a possible update of the access control information based on a result of the mining activity.

The above-described solution facilitates determining the right time for revising the access control system; for example, it is now possible to ascertain whether the revision of the access control system is needed, i.e., appropriate, useful or necessary. This result is achieved in a substantial automatic way, so that it is very accurate, reliable and reproducible. As a consequence, there is avoided (or at least substantially reduced) the risk of performing useless revisions of the access control system; this has a beneficial effect on a management cost of the information technology system. Conversely, there is avoided (or at least substantially reduced) the risk of delaying useful revisions of the access control system; this prevents data security and/or statutory law compliance exposures.

Figure 2:
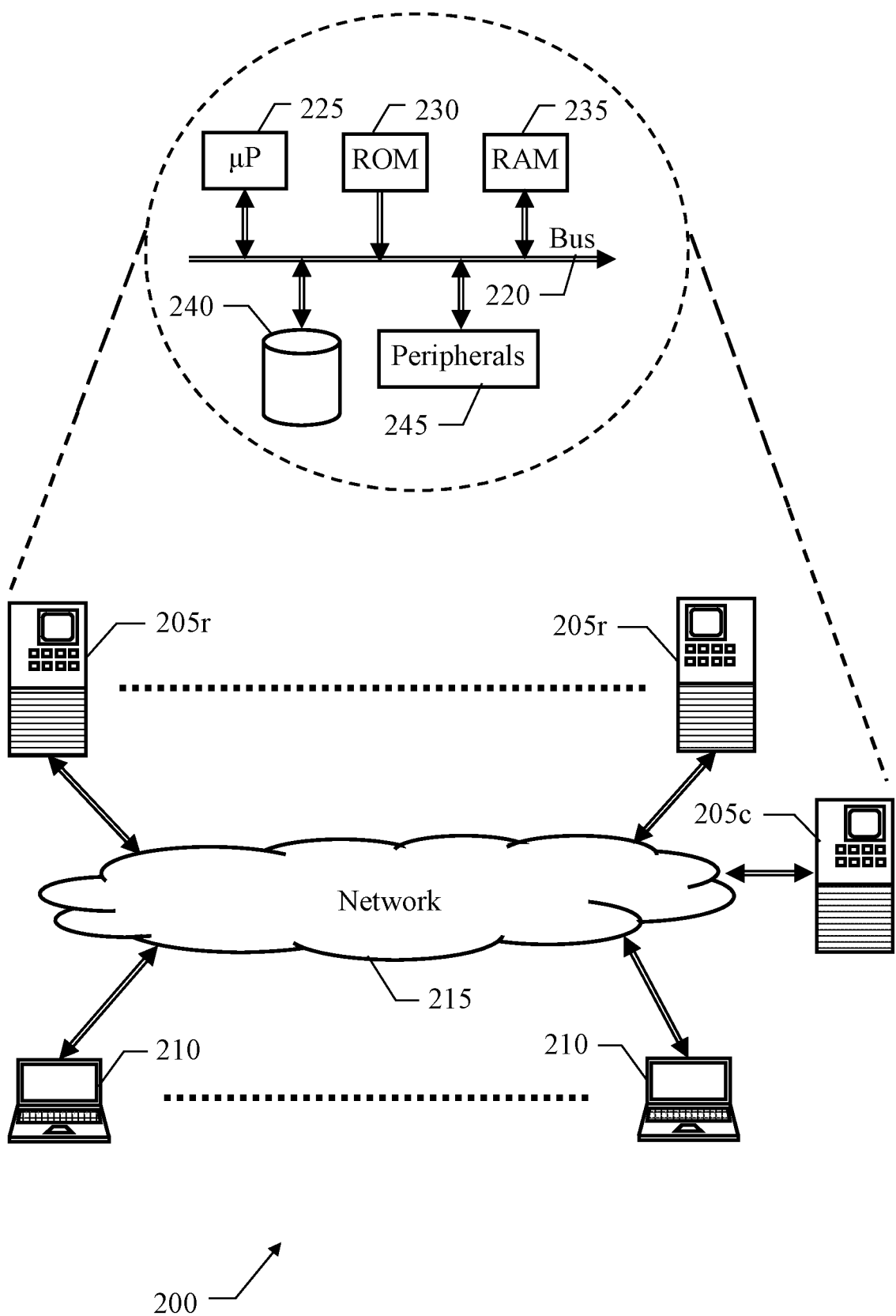
FIG. 2 shows a schematic block diagram of an information technology infrastructure wherein the solution according to an embodiment of the present disclosure may be practiced.

With reference now to FIG. 2, a schematic block diagram is shown of an information technology infrastructure 200 wherein the solution according to an embodiment of the present disclosure may be practiced.

The information technology infrastructure 200 has a distributed architecture based on a client/server model. Particularly, server computing machines, or simply servers 205$r$, 205$c$ provide services to client computing machines, or simply clients 210. For this purpose, the clients 210 communicate with the servers 205$r$, 205$c$ over a (telecommunication) network 215 (for example, based on the Internet) or cloud computing environment 500 of FIG. 5. More specifically, the clients 210 may function as one of the local computing devices 540 and servers 205$r$, 205$c$ may function as one of the nodes 510 both described below with respect to the cloud computing environment 500. The servers 205$r$, 205$c$ include one or more resource servers 205$r$ and a control server 205$c$ (or more). The resource servers 205$r$ implement the information technology system to be controlled; particularly, the resource servers 205$r$ have hardware and/or software resources (for example, devices, machines, files, programs, web pages and so on) that may be accessed only by (authorized) users of the clients 210 (for example, via services offered by the resource servers 205$r$, such as CRM (Customer Relationship Management), LDAP (Lightweight Directory Access Protocol), SIEM (Security Information and Event Management), SaaS (Software as a Service), e-mail and so on). The control server 205$c$ implements the access control system controlling the access to the resources of the resource servers 205$r$ by the users of the clients 210 (for example, to use devices, start/stop machines, read/write files, run programs, download contents and so on).

Each one of the above-described computing machines (i.e., servers 205$r$, 205$s$ and clients 210) includes several units that are connected among them through a bus structure 220 at one or more levels (with an architecture that is suitably scaled according to the type of the computing machine 205$r$, 205$s$, 210). Particularly, a microprocessor (µP) 225, or more, provides a logic capability of the computing machine 205$r$, 205$s$, 210; a non-volatile memory (ROM) 230 stores basic code for a bootstrap of the computing machine 205$r$, 205$s$, 210 and a volatile memory (RAM) 235 is used as a working memory by the microprocessor 225. The computing machine 205$r$, 205$s$, 210 is provided with a mass-memory 240 for storing programs and data (for example, storage devices of a data center, or more, wherein the servers 205$r$, 205$s$ are implemented, and corresponding SSDs (solid-state drives) for the clients 210). Moreover, the computing machine 205$r$, 205$s$, 210 includes a number of controllers for peripherals, or Input/Output (I/O) units, 245; for example, the peripherals 245 of the each server 205$r$, 205$s$ include a network adapter for plugging the server 205$r$, 205$s$ into the data center and then connecting it to a console of the data center for its control (for example, a personal computer, also provided with a drive for reading/writing removable storage units, such as of USB type) and to a switch/router sub-system of the data center for its communication with the network 215, whereas the peripherals 245 of each client 210 include a keyboard, a mouse, a monitor, a network adapter for connecting to the network 215, and a drive for reading/writing removable storage units (such as of USB (universal serial bus) type).

Figure 3:
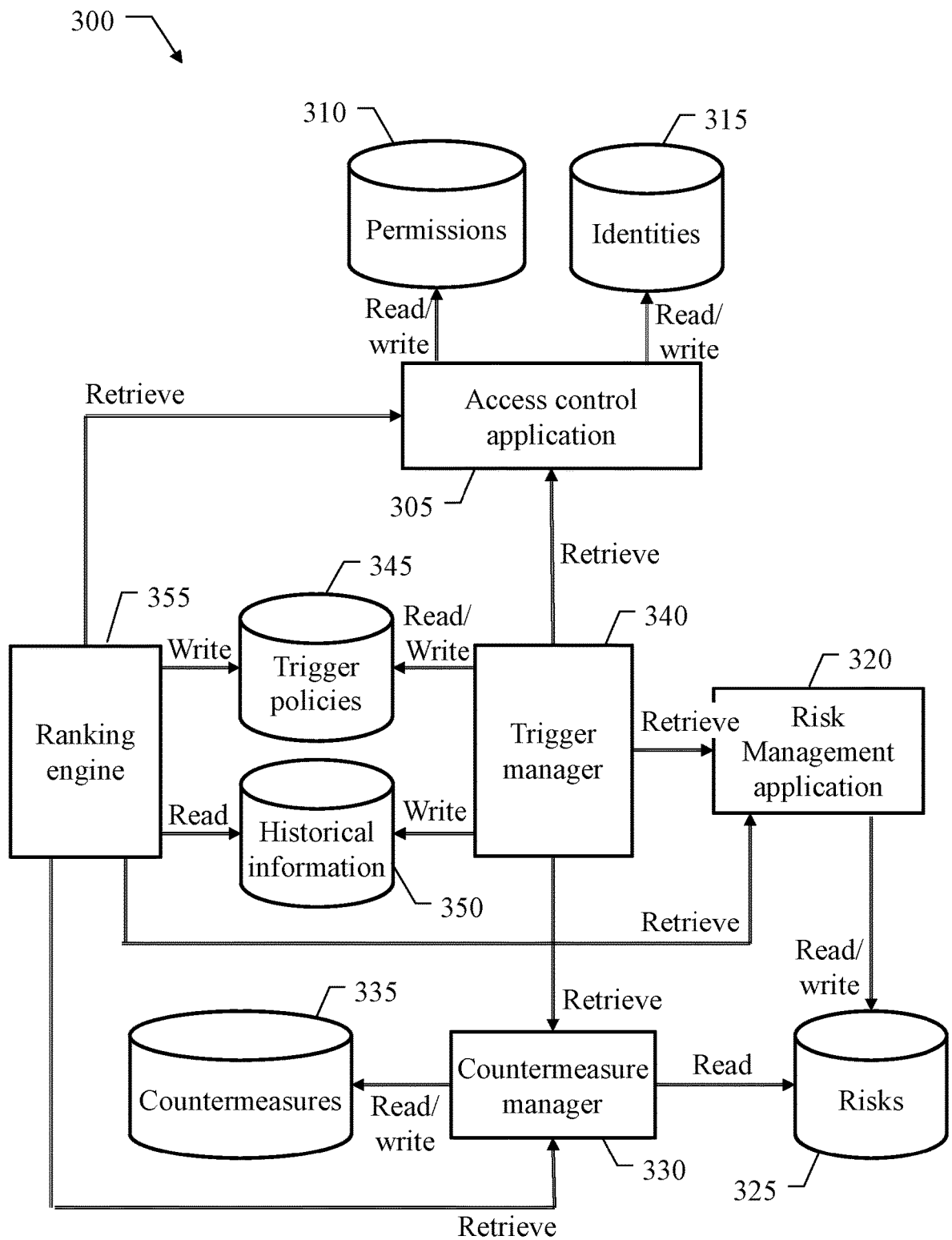
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are herein collectively referred to as software components 300. The software components 300 are typically stored in the mass-memory 240 and loaded (at least partially) into the working memory, ROM 230 and RAM 235, of the control server 205$c$ when the programs are running, together with an operating system and possible other application programs (not shown in the figure). The programs are initially installed into the mass-memory 24, for example, from removable storage units or from the network 215. In this respect, each program may be a module, segment or portion of code, which includes one or more executable instructions for implementing the specified logical function.

A (legacy) access control application 305 (for example, an IAM application) implements an access control process for the information technology system, i.e., for controlling the access to the resources of the resource servers by the users of the clients 210 (not shown in the figure); a commercial example of the access control application 305 is "IBM® Security Identity and Access Manager" by IBM® Corporation. IBM is a registered trademark of International Business Machines, Corp. For this purpose, the access control application 305 (running in the background as a service) intercepts any request for performing a selected activity on a resource of the resource servers from a user logged in a client and allows/prevents it according to the permissions granted to the user. The access control application 305 reads/writes a permission database 310 and an identity database 315 (for example, populated manually by a system administrator through a user interface of the access control application 305).

The permission/identity databases 310, 315 define the access control information used to control the access to the information technology system (with the access control application 305 together with the permission/identity databases 310, 315 that define the corresponding access control system). Particularly, the permission database 310 specifies the permissions of the users for accessing the resources of the information technology system.

When the access control application 305 is based on the RBAC model, the permission database 310 has an entry for each role; the entry indicates one or more permissions assigned to the role for performing one or more activities on one or more resources. For example, a developer is authorized to read/write projects on which s/he is working, a team leader is authorized to read/write all the projects of the developers of his/her team, a manager is authorized to read all the projects of the developers reporting thereto and so on.

Alternatively, when the access control application 305 is based on the ABAC model the permission database 310 has an entry for each rule. The entry indicates a permission which is granted for performing an activity (or more) on a resource (or more) when the rule is satisfied. The rule is based on one or more attributes; the attributes may relate to the resources (for example, their type, location, classification and so on), to the users (for example, responsibilities, duties, competences, department and so on), to the activities (for example, read, write, delete, approve and so on) and/or to a context (for example, date, time and so on). For example, the rules may indicate that an employee is authorized to update a report when s/he is in a specific location, a developer is authorized to update a program when it is in a test mode, no user is authorized to read a document before a certain date, and so on. The identity database 315 instead specifies the users that are registered with the access control application 305. For example, the identity database 315 has an entry for each user; the entry stores an account and password of the user, and it indicates one or more roles assigned to the user (in case of the RBAC model) or one or more attributes of the user (in case of the ABAC model).

A (legacy) risk management application 320 implements a risk management process for the information technology system, i.e., for managing its risks relating to the access control process. In general, a risk indicates a probability that a threat (i.e., the possibility of a damage having negative effects on the information technology system) takes place because of a vulnerability (i.e., a weakness of the corresponding access control system that may be exploited for this purpose). For example, the threat may relate to confidentiality, integrity, availability, authenticity and so on, and the vulnerability may relate to misuse or abuse of permissions due to their extent, combination and so on. The risk may be quantified by an impact of its occurrence in the information technology system (in terms of either lost money or recovery effort, such as man hours, processing power and so on). For example, the impact is defined by a loss expectancy of each asset (i.e., resource having a value for a corresponding organization) being damaged, given by the product of an exposure factor (measuring a subjective percentage of the damage to the asset) by a value of the asset.

The risk management application 320 reads/writes a risk database 325 (for example, populated automatically by any execution of the risk management process). The risk database 325 specifies the risks of the information technology system. For example, the risk database 325 has an entry for each asset and an entry for each risk; the entry of each asset indicates its value, and the entry of each risk indicates the roles/rules causing the risk, the assets that would be damaged by its occurrence and the corresponding exposure factor.

In the solution according to an embodiment of the present disclosure, a countermeasure manager 330 manages the countermeasures for mitigating the risks. In general, a countermeasure is an action taken to reduce the probability and/or the threat of one or more risks; for example, the countermeasure may relate to audits, procedures for handling exceptions, transfers of risks to third parties and so on. The countermeasure may be quantified by its cost (in terms of either money or any other burden, such as man hours, processing power and so on).

The countermeasure manager 330 reads the risk database 325 and it reads/writes a countermeasure database 335 (for example, populated manually by the system administrator through a user interface of the countermeasure manager 330). The countermeasure database 335 specifies the countermeasures that has been taken in the information technology system. For example, the countermeasure database 335 has an entry for each countermeasure; the entry indicates the risks that are mitigated by the countermeasure and its cost.

A trigger manager 340 triggers the revision of the access control system. The trigger manager 340 reads/writes a trigger policy repository 345 (for example, populated manually by the system administrator through a user interface of the trigger manager 340).

The trigger policy repository 345 defines the trigger policies. For example, the trigger policy repository 345 has an entry for each trigger policy; the entry specifies the trigger policy and the corresponding weight. The trigger policy is defined by a logic expression producing a logic value (true or false); the logic expression includes one or more conditions, each producing a logic value according to one or more policy parameters, i.e., state parameters and/or security parameters (which conditions may be combined with logic operators, such as AND, OR, NOT and so on). The state parameters are macro indicators relating to a (current) state of the whole access control system, or a relevant part thereof (i.e., not at the level of single resources, users or permissions), and particularly relating to changes thereof since a last revision of the access control system. For example, the state parameters may relate to the resources (for example, number of new resources, number of new resources in a specific location and so on), to the users (for example, number of new users, number of new users in a department, number of changes in an organizational chart and so on) and/or to the permissions (for example, number of new roles/rules, number of new users corresponding to the roles/rules, number of new permissions in the roles/rules, number of new attributes in the rules and so on). The security parameters relate to the risks of the access control system and/or to the countermeasures for mitigating them. The weight of the trigger policy is a number (for example, from 0 to 1), with the higher the effectiveness of the trigger policy in triggering the revision of the access control system the higher its weight.

For example, a simple trigger policy (based on both state parameters and security parameters) may be:

$$TP1=(Nuser>THuser) \text{ AND } (Naccount>THaccount)$$
$$\text{AND } (Caudit>THaudit),$$

wherein Nuser is the number of new users added to the identity database since a last revision of the access control system, THuser is a corresponding threshold, Naccount is the number of new accounts added to the human resource database since the last revision of the access control system, THaccount is a corresponding threshold, Caudit is an increase of the cost for auditing the human resource database since the last revision of the access control system, THaudit is a corresponding threshold and TP1 is the logic value of the trigger policy. The trigger policy may also be conditioned by one or more evaluation conditions, which are to be satisfied before the (conditioned) trigger policy may be evaluated. Each evaluation condition is based on the completion of a conditioning task (such as verifying information by a manager, reaching a certain degree of progress of a project and so on). In turn, the evaluation condition may depend on a logic expression (either part of the one defining the logic value of the trigger policy or independent therefrom), such as in the form of an IF/THEN construct.

Other examples of trigger policies with simple evaluation conditions may be:

TP2=(Nrole>THrole)|Mverify,

TP3=(Nexception>THexception) AND
(MAXmeasure>THmeasure)|IF (TP3) THEN
Wtransfer, TP4=(Nexception>THexception)|IF
(MAXpermission>THpermission) THEN
Wtransfer, wherein Nrole is the number of roles assigned to the users of a specific department, THrole is a corresponding threshold, Mverify is a verification of the roles assigned to the department by a manager thereof, Nexception is the number of exceptions to a separation of duty principle, THexception is a corresponding threshold, MAXmeasure is the maximum number of countermeasures taken for each exception, THmeasure is a corresponding threshold, Wtransfer is the transfer of the risk, MAXpermission is the maximum number of permissions given to a single user in the exceptions, THpermission is a corresponding threshold and TP2, TP3 and TP4 are the logic values of the trigger policies. Therefore, in the first case the task Mverify is performed and, once it has been completed, the logic expression (Nrole>THrole) is evaluated to determine the logic value TP2 of the trigger policy, in the second case if the logic expression ((Nexception>THexception) AND (MAXmeasure>THmeasure)) defining the trigger policy TP3 is true the task Wtransfer is performed and, once it has been completed, the logic expression ((Nexception>THexception) AND (MAXmeasure>THmeasure)) is evaluated again to determine the logic value TP3 of the trigger policy, and in the third case if the logic expression (MAXpermission>THpermission) is true the task Wtransfer is performed and, once it has been completed, the logic expression (Nexception>THexception) is evaluated to determine the logic value TP4 of the trigger policy.

The trigger manager 340 interacts with the access control application 305 to retrieve the state parameters, by reading them from the permission database 310, the identity database 315 and/or one or more databases of the information technology system (such as an inventory database of the resources, a human resource database of the users and so on). Moreover, the trigger manager 340 interacts with the risk management application 320 and with the countermeasure manager 330 to retrieve the security parameters, by reading them from the risk database 325 and from the countermeasure database 335, respectively (for the security parameters relating to the risks and to the countermeasures, respectively).

The trigger manager 340 writes a historical information database 350. The historical information database 350 logs historical information relating to the revisions of the access control system. For example, the historical information database 350 has an entry for each revision of the access control system that has been triggered by the trigger manager 340, for example, in the last 1-5 years. The entry indicates the (relevant) trigger policies that have been evaluated to true, meaning that they have contributed to trigger the revision of the access control system; moreover, the entry indicates a change of the access control information resulting from the revision (for example, the roles/rules that have been created, updated or deleted, the permissions that have been added, altered or removed for each updated role/rule, the roles that have been assigned or revoked to each user, the attributes that have been added or removed for each rule/user, and so on).

A ranking engine 355 updates the weights of the policies with a feedback mechanism. For this purpose, the ranking engine 355 reads the historical information database 350, retrieves information from the access control application 305, the risk management application 320 and the countermeasure manager 330, and writes the trigger policy repository 345.

Figure 4A:
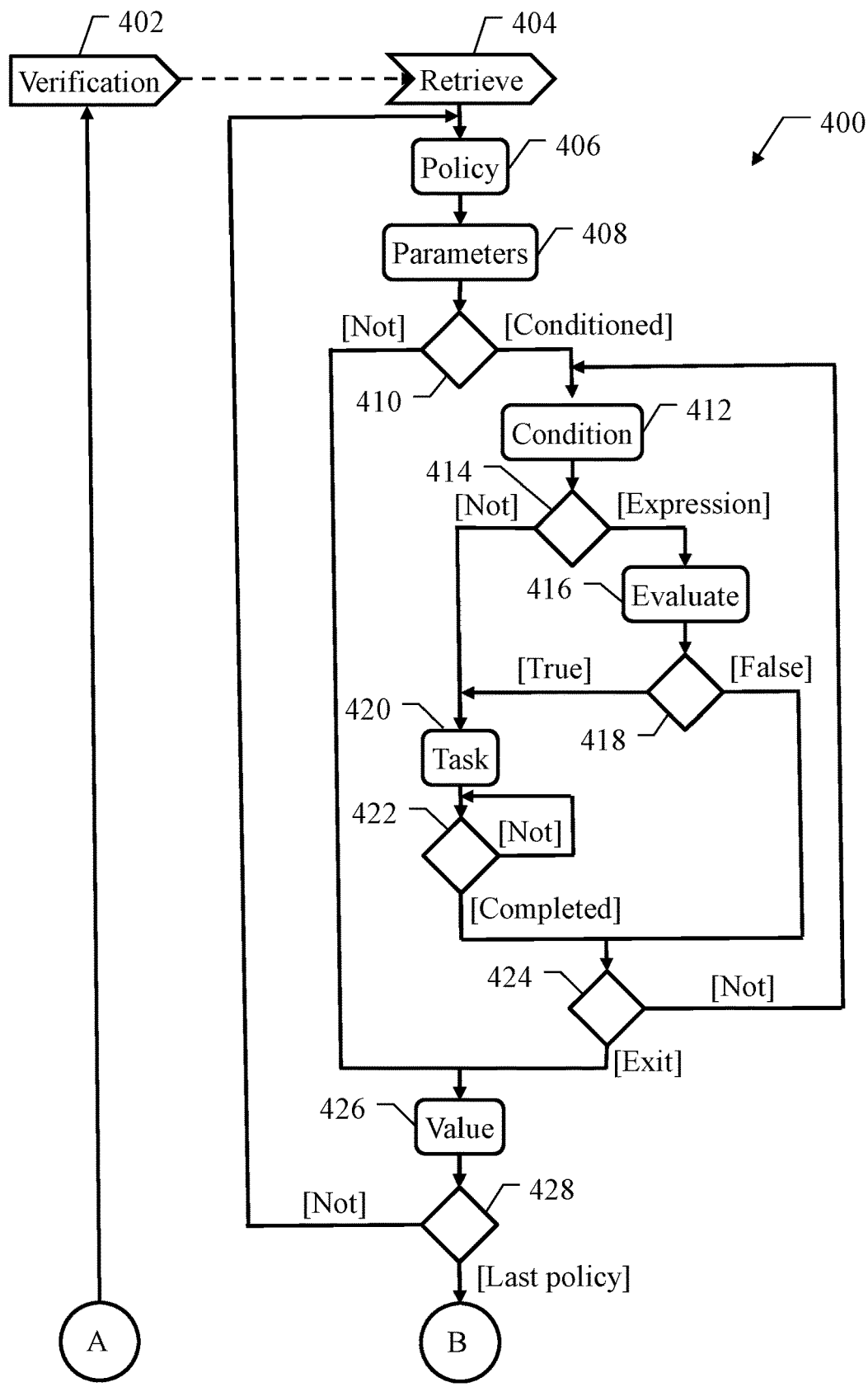
FIGS. 4A-4C show an activity diagram describing the flow of activities relating to an implementation of the solution according to an embodiment of the present disclosure.
Figure 4B:
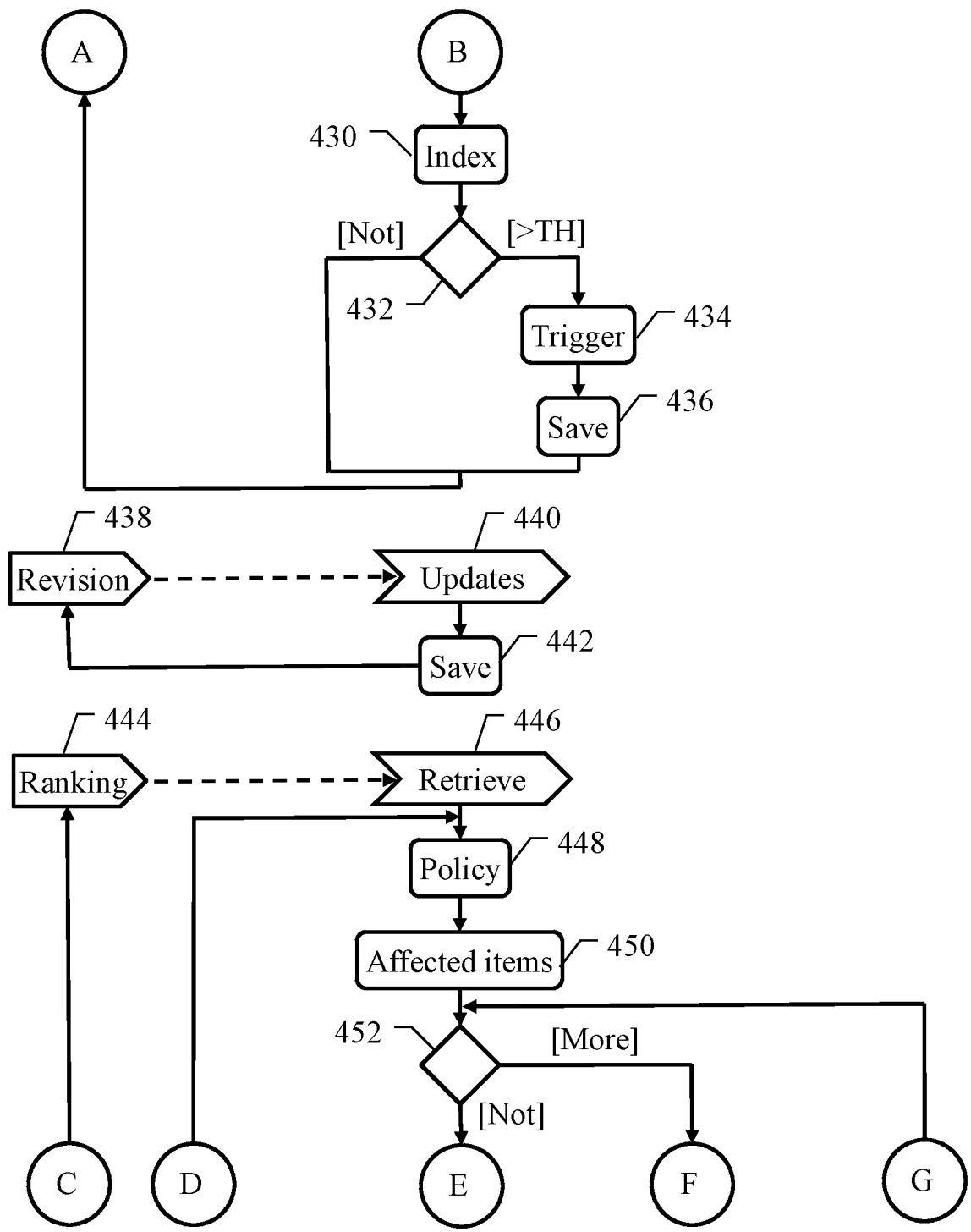
Figure 4C:
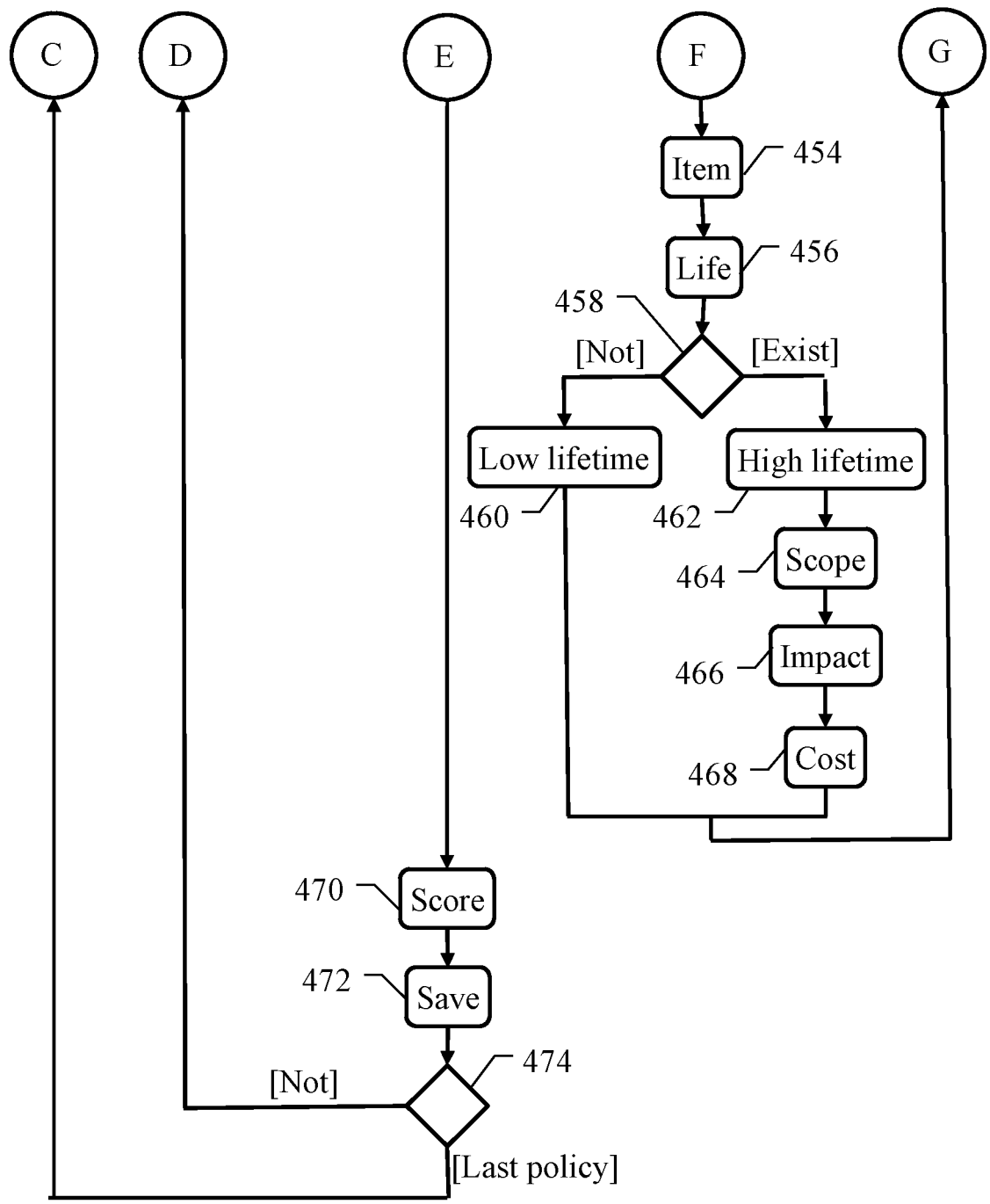

With reference now to FIGS. 4A-4C, an activity diagram is shown describing the flow of activities relating to an implementation of the solution according to an embodiment of the present disclosure.

Particularly, the activity diagram represents an exemplary process that may be used to trigger the revision of the access control system with a method 400. In this respect, each block may correspond to one or more executable instructions for implementing the specified logical function on the control server 205c.

The process passes from block 402 to block 404 when an event occurs starting a verification operation for the need of revising the access control system. For example, this may occur after a significant change of the policy parameters defining the trigger policies (such as the change of more than 10-20% thereof) and/or periodically (for example, every 1-7 days). In response, the trigger manager retrieves the trigger policies and their weights from the corresponding database.

A loop is then entered for processing the trigger policies. The loop begins at block 406, wherein the trigger manager takes a (current) trigger policy into account (starting from a first one in any arbitrary order).

The trigger manager at block 408 retrieves the policy parameters indicated in the trigger policy (preferably, with a cache mechanism); particularly, the state parameters are retrieved from the access control application, the security parameters relating to the risks are retrieved from the risk management application and the security parameters relating to the countermeasures are retrieved from the countermeasure manager.

The flow of activity branches at block 410 according to the type of the trigger policy. If the trigger policy is conditioned, a further loop is entered for processing the evaluation conditions of the (conditioned) trigger policy. The loop begins at block 412, wherein the trigger manager takes a (current) evaluation condition into account (starting from a first one in the corresponding order indicated in the trigger policy). The flow of activity branches at block 414 according to the type of the evaluation condition. If the evaluation condition depends on a logic expression, the trigger manager at block 416 evaluates it. The flow of activity branches at block 418 according to the logic value produced by the logic expression. If the logic expression has been evaluated to true, the process descends into block 420; the same point is also reached directly from the block 414 if the evaluation condition does not depend on any logic expression. At this point, the execution of the conditioning task is caused (for example, by sending a corresponding notification to a person, a corresponding command to a software application and so on). The trigger manager then enters an idle loop at block 422 waiting for the completion of the conditioning task. As soon as the conditioning task has been completed (for example, as notified by a corresponding message), and in any case after a predefine time-out, the process descends into block 424; the same point is also reached directly from the block 418 if the logic expression has been evaluated to false. The trigger manager now verifies whether a last evaluation condition has been taken into account. If not, the process returns to the block 412 for repeating the same operation on a next evaluation condition of the trigger policy. Conversely, as soon as all the evaluation conditions of the trigger policy have been taken into account (or immediately after a conditioning task has not been completed for any reason, i.e., false logic expression or time-out expiration), the corresponding loop is exit by descending into block 426; the same point is also reached directly from the block 410 if the trigger policy is not conditioned. The trigger manager now evaluates the logic expression of the trigger policy to determine its logic value (always set to false when any conditioning task of the trigger policy has not been completed), which logic value is saved into a working variable. The trigger manager at block 428 verifies whether a last trigger policy has been processed. If not, the process returns to the block 406 for repeating the same operations on a next trigger policy. Conversely, as soon as all the trigger policies have been processed, the loop is exit by descending into block 430.

At block 430, the trigger manager determines the trigger index according to the logic values and the weights of the trigger policies. For example, the trigger index is calculated by applying the following formula:

$$TIndex = \frac{\sum_{i=0}^{TOTp}[TP(i)\cdot\text{Weight}(i)]}{TOTtp},$$

wherein TOTtp is a total number of the trigger policies, TP(i) is a numerical value corresponding to the logic value of the i-th trigger policy (retrieved from the corresponding working variable), such as 1 for true and 0 for false, Weight(i) is the weight of the i-th trigger policy and TIndex is the value of the trigger index (similar considerations apply if the trigger index is calculated incrementally during the evaluation of the trigger policies). In this way, the trigger index has a value ranging from 0 to 1. Particularly, only the trigger policies evaluated to true contribute to the trigger index, with the contribution of these trigger policies that is proportional to their weight.

The trigger manager at block 432 compares the trigger index with a (trigger) threshold (for example, 0.5-0.7). If the trigger index is (possibly strictly) higher than the trigger threshold, the trigger manager at block 434 outputs an indication thereof so as to trigger a revision of the access control system; for example, the trigger manager sends a trigger message to the system administrator (such as via e-mail, SMS and the like), displays the trigger message on a monitor of the control server 205*c* and so on. The trigger message indicates a need of revising the access control system; the trigger message may also include additional information about the reason of doing so, such as the trigger index, the trigger polices with the highest weights that have been evaluated to true, and so on. At the same time, the trigger manager at block 436 adds a new entry to the historical database for this revision of the access control system (for example, identified by a corresponding timestamp); the trigger manager then adds an indication of the trigger policies that have been evaluated to true (and then have contributed to trigger the revision of the access control system) to the new entry. The process now returns to the block 402 (waiting for a next event triggering the verification process) from the block 436 or directly from the block 432 when the trigger index is (possibly strictly) lower than the trigger threshold (and then no revision of the access control system is needed).

When the revision of the access control system has been triggered, the trigger manager is in a waiting condition at block 438 for its completion. Particularly, the revision involves a mining activity, wherein a mapping of the users to the resources is discovered according to typical patterns of the users needing to access the resources; for example, the mining activity may be performed with a bottom-up approach, a top-down approach or a by-example approach. One or more changes to be applied to the access control information are then determined according to a result of the mining activity, i.e., the mapping users-to-resources (for example, in the roles and their assignments to the users for the RBAC model or in the rules and the attributes of the rules/users for the ABAC model). The permission database and/or the identity database are then updated according to the changes resulting from the mining activity (for example, by adding roles/rules, updating roles assigned to users, updating rules, adding/deleting attributes, deleting roles/rules, and so on).

The process passes to block 440 as soon as the trigger manager receives a notification of completion of the revision of the access control system (for example, via a command entered manually by the system administrator). In response thereto, the trigger manager retrieves an indication of the updates that have been applied to the access control information from the permission database and the identity database (through the access control application). The trigger manager at block 442 saves these updates into the corresponding entry of the historical database. The process then returns to the block 438 waiting for the completion of a next revision of the access control system.

In a completely independent way, the process passes from block 444 to block 446 as soon as a (ranking) period expires for performing a ranking operation of the trigger policies to update their weights (for example, every 7-14 days). In response thereto, the ranking engine retrieves the trigger policies and their weights from the corresponding database. A loop is then entered for processing the trigger policies.

The loop begins at block 448, wherein the ranking engine takes a (current) trigger policy into account (starting from a first one in any arbitrary order). The ranking engine at block 450 retrieves (from the historical database) an indication of affected control items, if any, which have been affected by the trigger policy; the affected control items are the roles/rules that have been created and/or updated during every revision of the access control information for which the (relevant) trigger policy has contributed to trigger its revision (i.e., it has been evaluated to true). A further loop is entered for processing the affected control items of the trigger policy. The loop begins at block 452, wherein the ranking engine verifies whether any more affected control item remains to be processed. If so the ranking engine al block 454 takes a (current) affected control item still to be processed into account (starting from a first one in any arbitrary order). The raking engine at block 456 retrieves (from the permission database through the access control application) a life status of the affected control item. The flow of activity branches at block 458 according to this life status. If the life status indicates that the affected control item does not exist any longer, the ranking engine at block 460 sets a lifetime indicator of the affected control item to a low value, for example, 0. Conversely, if the life status indicates that the affected control item still exists, the ranking engine at block 462 sets the lifetime indicator of the affected control item to a high value, for example, 1.

In the latter case, the ranking engine at block 464 calculates a scope indicator of the affected control item. The scope indicator depends on the permissions of the affected control item and/or on the corresponding users, i.e., the users assigned to the (affected) role or the users whose attributes match the attributes of the (affected) rule (according to information retrieved from the role database and the identity database through the access control application). For example, the scope indicator is calculated by applying the following formula:

$$\text{Scope (item)} = \frac{Nuser}{TOTuser} \cdot \frac{\sum_{i=0}^{TOTapp}\left[\frac{Nperm(app(i), \text{item})}{TOTperm(app(i))}\right]}{TOTapp},$$

wherein Nuser is the number of users corresponding to the affected control item, TOTuser is the total number of users, TOTapp is the total number of the (protected) resources of the information technology system, such as software applications, Nperm(app(i),item) is the number of permissions of the affected control item pertaining to the i-th software application, TOTperm(app(i)) is the total number of permissions pertaining to the i-th software application and Scope (item) is the value of the scope indicator (then ranging from 0 to 1). In this way, the higher the users corresponding to the affected control item and/or the permissions of the affected control item the higher the scope indicator of the affected control item.

The ranking engine at block 466 calculates an impact indicator of the affected control item. The impact indicator depends on the impact of the risks caused by the affected control item (according to information retrieved from the risk database through the risk management application). For example, in a basic implementation the impact indicator is calculated by applying the following formula:

$$\text{Impact (item)} = \frac{\sum_{i=0}^{Nrisk}[\text{Level}(i)]}{Nrisk},$$

wherein Nrisk is the number of risks caused by the impacted control item, Level(i) is a qualitative level of the impact of the i-th risk (ranging from 0 to 1, such as ⅓ for low, ⅔ for medium and 1 for high) and Impact(item) is the value of the impact indicator (then ranging from 0 to 1). In a more complete implementation, instead, the impact indicator is calculated by applying the following formula:

$$\text{Impact (item)} = \frac{\sum_{i=0}^{Nasset}\sum_{j=0}^{Nrisk}[Expo(\text{asset}(i), \text{risk}(j)) \cdot \text{Value (asset}(i))]}{Nasset \cdot TOTvalue},$$

wherein Nasset is the number of assets controlled by the affected control item, Nrisk is the number of risks caused by the impacted control item, Expo(asset(i),risk(j)) is the exposure factor of the i-th asset to the j-th risk, Value (asset(i)) is the value of the i-th asset (with Expo(asset(i), risk(j))·Value (asset(i)) representing the corresponding loss expectancy), TOTvalue is the total values of all the assets, and Impact (item) is the value of the impact indicator (then ranging from 0 to 1).

The ranking engine at block 468 calculates a cost indicator of the affected control item. The cost indicator depends on the countermeasures that have been taken to mitigate the risks caused by the affected control item (according to information retrieved from the risk database and the countermeasure database through the risk management application and the countermeasure manager, respectively). For example, the cost indicator is calculated by applying the following formula:

$$\text{Cost (item)} = \frac{Nuser}{TOTuser} \cdot \frac{\sum_{i=0}^{TOTmeasure}[\text{Cost (measure}(i), \text{item})]}{\text{Cost (measure}(i))},$$

wherein Nuser is the number of users corresponding to the affected control item, TOTuser is the total number of users, TOTmeasure is the total number of countermeasures that have been taken to mitigate the risks caused by the affected control item, Cost(measure(i), item) is a percentage of the cost of the i-th countermeasure pertaining to the affected control item, Cost(measure(i)) is the cost of the i-th countermeasure and Cost(item) is the value of the cost indicator (then ranging from 0 to 1); in turn, the percentage of the cost of each countermeasure pertaining to the affected control item Cost(measure(i), item) is set to:

$$\text{Cost (measure}(i), \text{item}) = \frac{Nuser}{TOTuser} \cdot \frac{\text{Cost (measure}(i)}{Nitem},$$

wherein Nitem is the number of control items (roles/rules) causing the risks mitigated by the countermeasure.

The process then returns to the block 452 to repeat the same operations. With reference again to the block 452, as soon as no more affected control item remains to be processed (always true when the trigger policy has no affected control item since it did not contribute to any revision of the access control system) the process descends into block 470. At this point, the ranking engine calculates the weight of the trigger policy according to the lifetime indicator, the scope indicator, the impact indicator and the cost indicator of its affected control items. For example, the weight is calculated by applying the following formula:

$$\text{Weight}(tp) = \frac{\sum_{i=0}^{TOT(item)}\left[\frac{\text{Life(item}(i)) \cdot \text{Scope(item}(i))}{\text{Impact(item}(i)) \cdot \text{Cost(item}(i))}\right]}{TOT(item)},$$

wherein TOT(item) is the total number of the affected control items, Life(item(i)) is the lifetime indicator of the i-th affected control item, Scope(item(i)) is the scope indicator of the i-th affected control item, Impact(item(i)) is the impact indicator of the i-th affected control item, Cost(item(i)) is the cost indicator of the i-th affected control item and Weight(tp) is the weight of the trigger policy (then ranging from 0 to 1). In this way, the weight of the trigger policy increases with the persistence and with the users/permissions of the impacted control items, whereas it decreases with the impact of the risks caused by the impacted control items and with the cost of the countermeasures that have been taken to mitigate them.

Alternatively, it is possible to update the weight of each affected control item incrementally. For example, the weight is decremented (down to reset to zero) when the affected control item does not exist any longer or is incremented (or simply left unchanged) when the affected control item still exists, it is decremented when the scope indicator is (possibly strictly) lower than a (scope) threshold or is incremented when the scope indicator is (possibly strictly) higher than the scope threshold, it is decremented when the impact indicator is (possibly strictly) higher than an (impact) threshold or is incremented when the impact indicator is (possibly strictly) lower than the impact threshold, and it is decremented when the cost indicator is (possible strictly) higher than a (cost) threshold or is incremented when the cost indicator is (possible strictly) lower than the cost threshold; the decrements and increments are by corresponding delta values, for example, 1-5% of the weight and 1-5% of its complement to 1, respectively.

In both cases, the ranking engine at block 472 saves the (new) weight of the trigger policy into the corresponding entry of the trigger policy database (by replacing its previous value, initialized manually or to a default value). The ranking engine at block 474 verifies whether a last trigger policy has been processed. If not, the process returns to the block 448 for repeating the same operations on a next trigger policy. Conversely, as soon as all the trigger policies have been processed, the corresponding loop is exit by returning to the block 444 waiting for a next expiration of the ranking period.

As a result, the weights of the trigger policies self-adapt to their effectiveness in triggering the revision of the access control system. Indeed, any revision, for which one or more relevant trigger policies have contributed to trigger its execution, has involved an update of the access control information; particularly, one or more affected control items may have been created/updated. For each affected control item, if it still exists at a later (ranking) time when the ranking process is performed, this means that its usefulness is likely to be high; conversely, if the affected control item does not exist any longer at the later ranking time, this means that its usefulness is likely to be low. Even more important, if the affected control item has a large scope (for example, defined by a high number of permissions and/or a high number of corresponding users), this means that its usefulness is likely to be high; conversely, if the affected control item has a scarce scope (for example, defined by a low number of permissions and/or a low number of corresponding users), this means that its usefulness is likely to be low. Instead, if the affected control item has caused (new) risks having a high impact, this means that its usefulness is likely to be low; conversely, if the affected control item has caused no risks or only risks with low impact, this means that its usefulness is likely to be high. Likewise, if countermeasures with high costs have been taken to mitigate the (new) risks caused by the affected control item, this means that its usefulness is likely to be low; conversely, if the affected control item has not required any countermeasures to mitigate risks caused by it or only countermeasures with low cost, this means that its usefulness is likely to be high. When most affected control items are deemed to have a high usefulness, the revision as well is likely to have been useful and then the relevant trigger policies (which have contributed to trigger it) are likely to be very effective; in this case, the weights of the relevant trigger policies are increased so that they will have a higher weight in the next verification processes. Conversely, when most affected control items are deemed to have a low usefulness, the revision as well is likely to have been useless and then the relevant trigger policies (which have contributed to trigger it) are likely to be poorly effective; in this case, the weights of the relevant trigger policies are decreased so that they will have a lower weight in the next verification processes.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/a should be intended as one or more items (unless expressly indicated otherwise), and the term means for (or any means-plus-function formulation) should be intended as any structure adapted or configured for carrying out the relevant function.

For example, an embodiment provides a method for facilitating a maintenance of an access control system (for controlling access to one or more resources of an information technology system by one or more subjects). The information technology system may be of any type (for example, based on a local, wide area, global, cellular or satellite network, exploiting any type of wired and/or wireless connections, with a stand-alone architecture and so on), with any number and type of resources (for example, partial, different or additional resources with respect to the ones mentioned above) whose access has to be controlled by any number and type of subjects (for example, users, programs, services and so on).

In an embodiment, the access control system is for controlling the access according to corresponding access control information. However, the access control information may be of any type (for example, based on roles and assignments for a RBAC model, rules and attributes for an ABAC model, tables for an Access Control List (ACL) model, and so on) for proving any type of control (for example, enabling/denying every activity, requesting further actions, such as entering a second level password, to enable specific activities, and so on).

In an embodiment, the method includes the following steps implemented by a control computing system. However, the control computing system may be of any type (see below) and the steps may be performed at any time (for example, in response to any significant change of the policy parameters, periodically, upon manual request, any combination thereof and so on).

In an embodiment, the method includes retrieving (by the control computing system) one or more trigger policies. However, the trigger policies may be retrieved in any number and in any way (for example, from any memory structure such as a database, a file and the like, via a read/query operation, a local/remote command and so on).

In an embodiment, each trigger policy is based on one or more policy parameters. However, the trigger policy may be based in any way on any number of policy parameters (for example, via a logic expression, a rule, a statement, with each trigger policy based only on one or more state parameters, only one or more security parameters, both of them, and so on).

In an embodiment, the policy parameters of the trigger policies include one or more state parameters relating to a current state of the access control system. However, the state parameters may be in any number and of any type (for example, relating to the resources, the subjects, the permissions, any combination thereof, partial, different or additional ones with respect to the state parameters mentioned above, and so on).

In an embodiment, the policy parameters of the trigger policies include one or more security parameters relating to one or more risks of the access control system and/or to one or more countermeasures for mitigating the risks. However, the security parameters may be in any number and of any type (for example, relating to the risks, the countermeasures, both of them, with each risk having none or one or more countermeasures, with each countermeasure mitigating one or more risks, with partial, different or additional security parameters with respect to the ones mentioned above, and so on).

In an embodiment, the method includes retrieving (by the control computing system) the policy parameters. However, the policy parameters may be retrieved in any way (for example, from partial, different or additional sources with respect to the ones mentioned above, through corresponding applications or directly, via read/query operations, local/remote commands and so on).

In an embodiment, the method includes evaluating (by the control computing system) the trigger policies according to the corresponding policy parameters. However, this operation may be performed in any way (for example, by evaluating a logic expression, calculating a formula, applying a rule, exploiting analytics techniques and so on) to determine any value of each trigger policy (for example, a logic value, a discrete level, a numerical value and so on).

In an embodiment, the method includes determining (by the control computing system) a trigger indicator according to a result of said evaluating the trigger policies. However, the trigger indicator may be of any type (for example, a logic value, a discrete value that may take any number of levels, a numerical value and so on) and it may be determined in any way (for example, by calculating any formula based on the values of the trigger policies, applying any thresholding techniques, exploiting cognitive techniques and so on).

In an embodiment, the method includes outputting (by the control computing system) an indication of the trigger indicator. However, the trigger indicator may be output in any way (for example, displayed, transmitted to any person(s), provided to any software application and so on) and in any form (for example, by its value, an explanatory text, an alert, any combination thereof and so on).

In an embodiment, the output of the trigger indicator is for triggering a revision of the access control system in response thereto. However, the revision of the access control system may be triggered in any way (for example, suggesting it to any person(s), starting it automatically and so on) according to the trigger indicator (for example, simply indicating that it is needed, providing a corresponding level of priority based on its value, and so on).

In an embodiment, the revision of the access control system includes a mining activity for mapping the subjects to the resources. However, the mining activity may be of any type (for example, role mining, rule mining and so on) and performed in any way (for example, manually, with the aid of automatic tools, such as based on analytics techniques, and so on).

In an embodiment, the revision of the access control system includes a possible update of the access control information based on a result of the mining activity. However, the access control information may be updated in any way (for example, by adding/updating/deleting roles, rules, attributes, identities, access control lists and so on in any memory structure, such as one or more databases or files, and so on), down to none.

Further embodiments provide additional advantageous features, which may however be omitted at all in a basic implementation.

Particularly, in an embodiment the method includes performing the mining activity in response to the trigger indicator having a positive value indicative of a need of the revision. However, the positive value of the trigger indicator may be of any type (for example, indicating that the revision is simply needed, that the revision is appropriate, useful or necessary, and so on).

In an embodiment, the method includes updating the access control information according to the result of the mining activity. However, the access control information may be updated in any way according to the result of the mining activity (for example, manually, automatically, accepting proposed updates and so on).

In an embodiment, the state parameters relate to the resources, the subjects and/or one or more permissions being granted by the access control system (each for performing one or more activities on one or more of the resources by one or more of the subjects). However, the state parameters may relate to the resources, the subjects and/or the permissions in any way (for example, in the form of numbers, types, relationships and so on).

In an embodiment, the access control information includes an indication of one or more roles. However, the roles may be in any number and of any type (for example, executive, manager, developer, accountant and so on).

In an embodiment, each role has one or more permissions each for performing one or more activities on one or more of the resources. However, the permissions/activities may be in any number and of any type (for example, partial, different or additional permissions/activities with respect to the ones mentioned above).

In an embodiment, the access control information includes an indication of one or more of the roles assigned to each of the subjects. However, each subject may be assigned any number of roles.

In an embodiment, the mining activity is a role mining. However, the role mining may be of any type (for example, bottom-up, top-down, by-example, resulting in addition of roles, updating of permissions/assignments of roles, deletion of roles and so on).

In an embodiment, the access control information includes one or more rules. However, the rules may be in any number and of any type (for example, IF/THEN constructs, logic expressions, and so on).

In an embodiment, each rule is based on one or more attributes. However, the attributes may be in any number and of any type (for example, relating to the resources, the subjects, the activities, the context, any combination thereof and so on).

In an embodiment, each rule indicates at least one permission (for performing at least one activity on at least one of the resources when the rule is satisfied). However, the rule may indicate any number and type of permissions (partial, different or additional ones with respect to the permissions mentioned above) relating to the activities in any way (for example, enabling, denying and so on).

In an embodiment, the mining activity is a rule mining. However, the rule mining may be of any type (for example, bottom-up, top-down, by-example, resulting in addition/updating/deletion of rules, change of attributes and so on).

In an embodiment, the method includes determining (by the control computing system) the trigger indicator according to corresponding weights assigned to the trigger policies. However, the weights may be of any type (for example, discrete/continuous values, flags, fixed/variable and so on) and they may be used to determine the trigger indicator in any way (for example, by weighting the values of the trigger policies, enabling/disabling their consideration and so on).

In an embodiment, the method includes storing (by the control computing system) historical information indicative of at least one occurrence of the revision. However, the historical information may be of any type (for example, all the changes applied to the access control information or only the most relevant ones, partial, different or additional pieces of information with respect to the ones mentioned above, and so on), relating to any number of occurrences of the revision (for example, only the last revision, a pre-determined number of them, all the ones in a pre-determined period and so on) and stored in any way (for example, in any memory structure such as a database, a file and so on).

In an embodiment, the historical information is indicative of relevant one or more of the trigger policies contributing to trigger the revision. However, the relevant trigger policies may be in any number and defined in any way (for example, all the trigger policies evaluated to true, the trigger policies evaluated to true and with the weights higher than a threshold, a pre-defined number of the trigger policies evaluated to true and having the highest weights, and so on).

In an embodiment, the method includes updating (by the control computing system) the weights of the relevant trigger polices. However, the weights may be updated in any way (for example, by re-calculating, increasing/decreasing by delta values and so on) according to any source(s) of information (for example, the historical information, the access control information, the policy parameters, any combination thereof and so on).

In an embodiment, the weights of the relevant trigger policies are updated according to the historical information and to the access control system at a ranking time following the revision. However, the weights may be updated in any way according to the historical information (for example, as is, weighted according to their age, and so on) and to the access control system (for example, according to its access control information, risks, countermeasures and so on) at any ranking time (for example, with a pre-defined delay, continually according to a pre-defined period and so on).

In an embodiment, the method includes storing (by the control computing system) the historical information comprising an indication of one or more affected control items contributing to define the access control information being affected by the revision. However, the affected control items may be in any number and of any type (for example, role, rules, all the created/updated ones, only the created ones and so on).

In an embodiment, the method includes updating (by the control computing system) the weights of the relevant trigger policies according to the affected control items at the ranking time. However, the weights may be updated according to the affected control items in any way (for example, by taking into account the corresponding countermeasures, risks, scopes, lifetimes, any combination thereof and so on).

In an embodiment, the method includes determining (by the control computing system) corresponding cost indicators of the affected control items. However, the cost indicators may be of any type (for example, number of countermeasures, pertaining costs, such as expenses, burdens and the like, corresponding subjects and so on) and determined in any way (for example, calculated with any linear/non-linear formula based on any relevant values retrieved through corresponding sources or directly via read/query operations, local/remote commands, retrieving it in the same way, and so on).

In an embodiment, the cost indicator of each of the affected control items is based on the countermeasures for mitigating the risks caused by the affected control item at the ranking time. However, the cost indicator may be based in any way on the countermeasures corresponding to the affected control item (for example, according to the corresponding subjects, costs, any combination thereof and so on).

In an embodiment, the method includes updating (by the control computing system) the weights of the relevant trigger policies according to the cost indicators of the affected control items. However, the weights may be updated in any way according to the cost indicators (for example, using them in any linear/non-linear way to calculate the weights, increasing/decreasing the weights by a fixed value or by a value proportional thereto when they are below/above any threshold, and so on).

In an embodiment, the method includes calculating (by the control computing system) the cost indicator of each of the affected control items according to the subjects corresponding to the affected control item and/or to corresponding costs of the countermeasures for mitigating the risks caused by the affected control item pertaining thereto. However, the cost indicator may be calculated in any way according the subjects corresponding to the affected control item (for example, on the subjects assigned to the affected role, the subjects whose attributes match the ones of the affected rule, their number, their number calculated by weighing the subjects according to their type, and so on) and to the pertaining costs of the countermeasures (for example, proportional to the corresponding subjects, inversely proportional to the control items causing the corresponding risks, any combination thereof and so on).

In an embodiment, the method includes determining (by the control computing system) corresponding impact indicators of the affected control items. However, the impact indicators may be of any type (for example, loss expectancies, qualitative levels, any combination thereof and so on) and determined in any way (for example, calculating them with any linear/non-linear formula based on any relevant values retrieved through corresponding sources or directly via read/query operations, local/remote commands, retrieving them in the same way, and so on).

In an embodiment, the impact indicator of each of the affected control items is based on the risks caused by the affected control item at the ranking time. However, the impact indicator may be based in any way on the risks corresponding to the affected control item (for example, according to corresponding levels, losses, any combination thereof and so on).

In an embodiment, the method includes updating (by the control computing system) the weights of the relevant trigger policies according to the impact indicators of the affected control items. However, the weights may be updated in any way according to the impact indicators (for example, either the same or different with respect to the cost indicators).

In an embodiment, the method includes calculating (by the control computing system) the impact indicator of each of the affected control items according to corresponding exposure factors of the risks caused by the affected control item and to corresponding values of one or more assets of the information technology system being affected by the risks caused by the affected control item. However, the impact indicator may be calculated in any way (for example, linearly, on-linearly and so on) according to any exposure factors and values of assets (for example, partial, different or additional exposure factors/values with respect to the ones mentioned above).

In an embodiment, the method includes determining (by the control computing system) corresponding scope indicators of the affected control items at the ranking time. However, the scope indicators may be of any type (for example, based on the subjects corresponding to the affected control items, the permissions of the affected control items, any combination thereof and so on) and they may be determined in any way (for example, calculating them with any linear/non-linear formula based on any relevant values retrieved through corresponding sources or directly via read/query operations, local/remote commands, retrieving them in the same way, and so on).

In an embodiment, the scope indicator of each of the affected control items is based on the subjects corresponding to the affected control item and/or on one or more permissions given by the affected control item (each for performing one or more activities on one or more of the resources). However, the scope indicator may be based in any way on the subjects corresponding to the affected control item (for example, on the subjects assigned to the affected role, the subjects whose attributes match the ones of the affected rule, their number, their number calculated by weighing the subjects according to their type, and so on) and on the permissions of the affected control item (for example, on their number in general, their number with respect to each resource, possibly weighed according to the type of the resource, and so on).

In an embodiment, the method includes updating (by the control computing system) the weights of the relevant trigger policies according to the scope indicators of the affected control items. However, the weights may be updated in any way according to the scope indicators (for example, either the same or different with respect to the cost/impact indicators).

In an embodiment, the method includes determining (by the control computing system) corresponding lifetime indicators of the affected control items at the ranking time. However, the lifetime indicators may be of any type (for example, simply indicating whether the affected control items still exist or not, measuring the time elapsed from their creation or last modification, and so on).

In an embodiment, the method includes updating (by the control computing system) the weights of the relevant trigger policies according to the lifetime indicators of the affected control items. However, the weights may be updated in any way according to the lifetime indicators (for example, proportionally to their values, simply resetting the weights when the affected control items do not exist any longer, and so on).

In an embodiment, conditioned one or more of the trigger policies include an indication of one or more evaluation conditions. However, the conditioned trigger policies may be in any number (down to zero), each comprising any number and type of evaluation conditions (for example, requesting the completion of a task, the occurrence of an event, either depending or not on any logic expression, and so on).

In an embodiment, the method includes conditioning (by the control computing system) said evaluating each of the conditioned trigger policies on the corresponding evaluation conditions. However, the evaluation of each conditioned trigger policy may be conditioned in any way (for example, waiting for the completion of a conditioning task, waiting for the occurrence of an event, with or without a corresponding time-out, and so on).

In an embodiment, at least one of the evaluation conditions is a completion of a corresponding conditioning task. However, the conditioning task may be of any type (for example, partial, different or additional conditioning tasks with respect to the ones mentioned above).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a control computing system to perform the above-mentioned method. An embodiment provides a computer program product, which includes one or more computer readable storage media that have program instructions collectively stored therein; the program instructions are readable by a control computing system to cause the computing system to perform the same method. However, the computer program may be implemented as a stand-alone module, as a plug-in for a pre-existing software application (for example, the access control application), directly therein or deployed as a service that is accessed via a network (such as in the Internet). Moreover, the computer program may be executed on any control computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a control computing system comprising means that are configured for performing the steps of the above-described method. An embodiment provides a control computing system comprising a circuit (i.e., any hardware suitably configured, for example, by software) for performing each step of the above-described method. However, the control computing system may be of any type (for example, one or more physical/virtual machines, a static or dynamic combination thereof, such as in a cloud computing environment, either the same as or different from the one used to control the access to the information technology system, and so on).

Generally, similar considerations apply if the system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

It may be appreciated that FIGS. 3 and 4A-4C provide only an illustration of an implementation and does not imply any limitations with regard to how different embodiments may be implemented. Many modifications to the depicted environments may be made based on design and implementation requirements.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
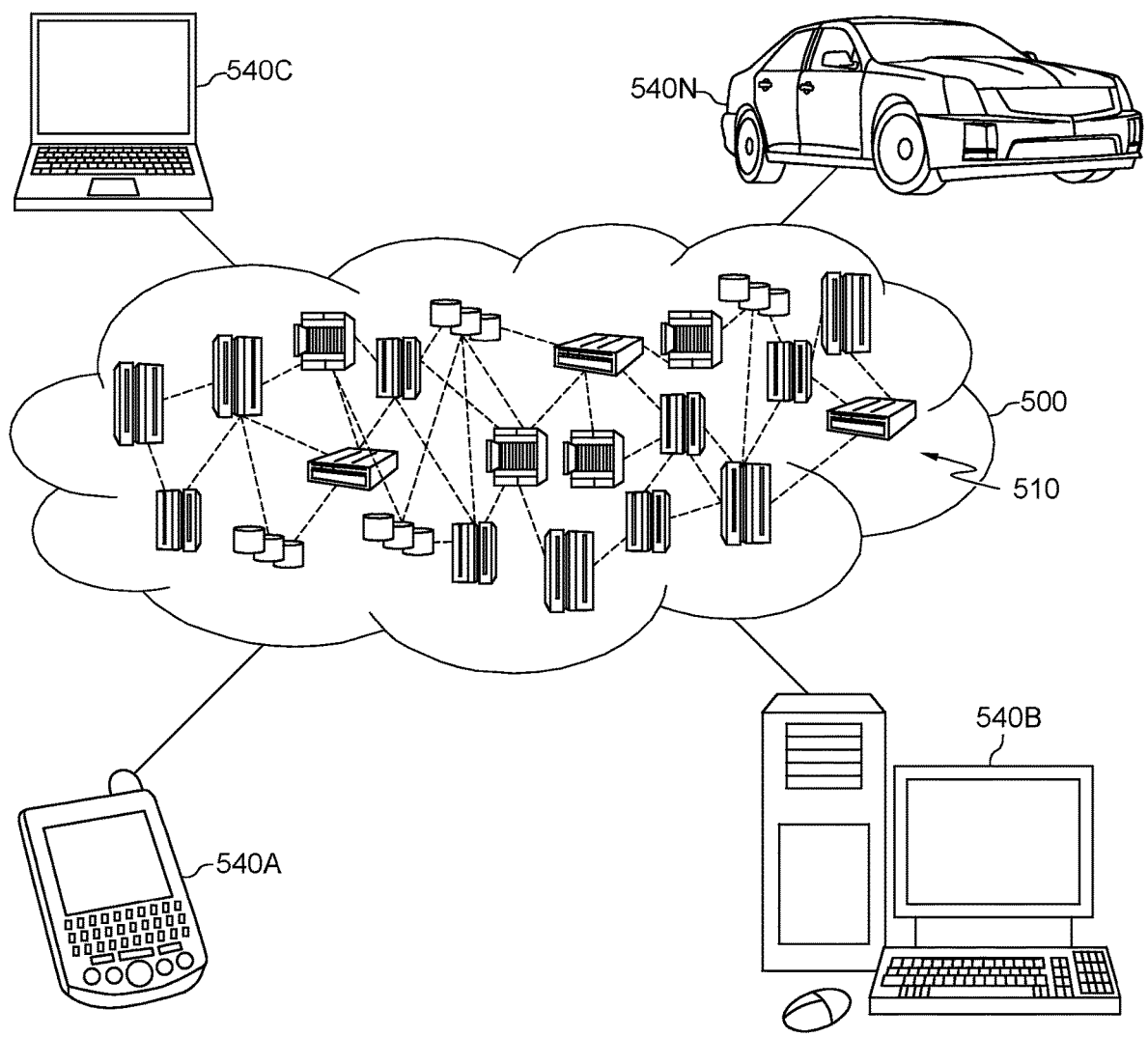
FIG. 5 shows a cloud computing environment according to an embodiment of the present invention.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
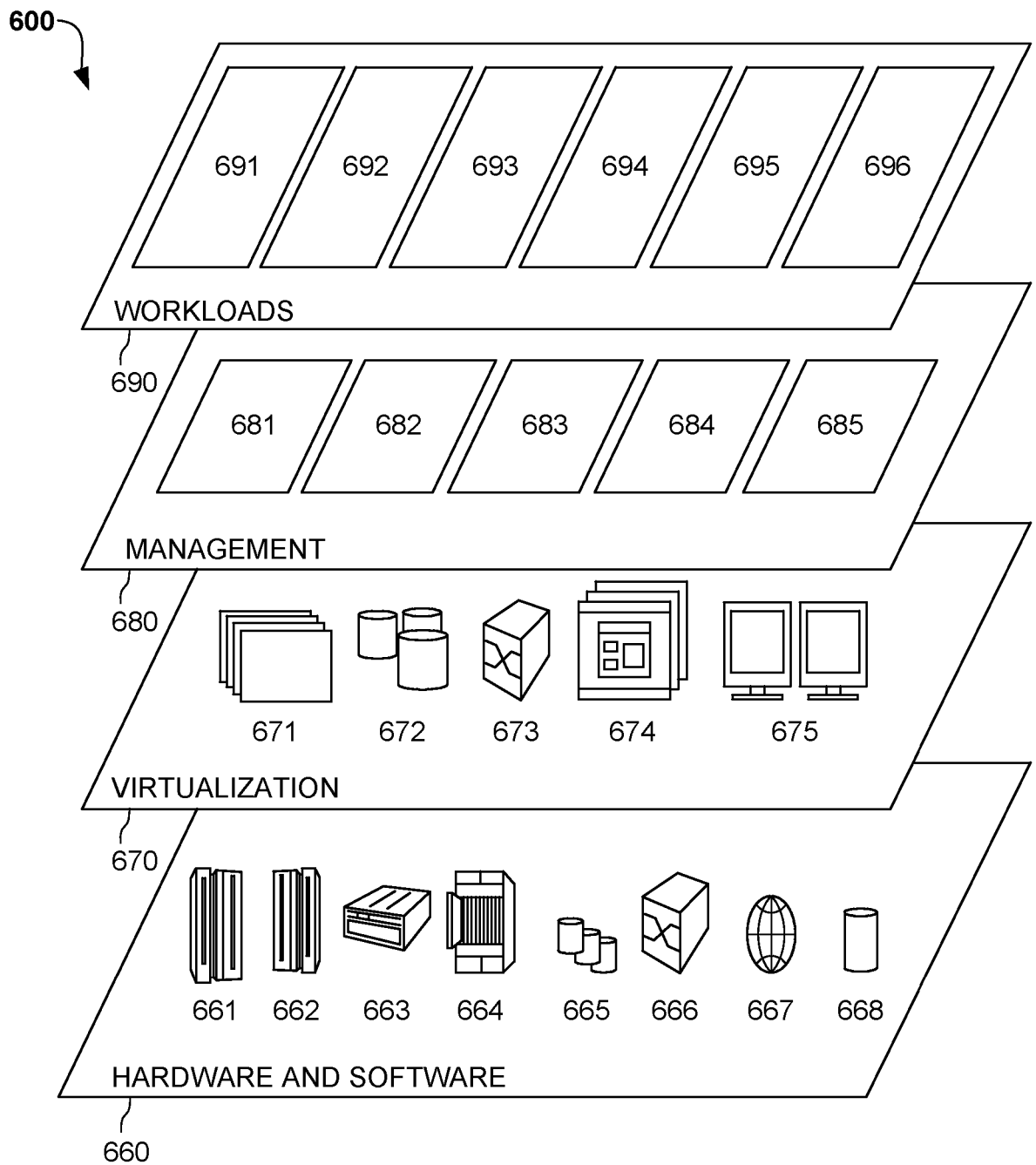
FIG. 6 shows abstraction model layers according to an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the mass-memory 240 as shown in FIG. 2; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and access control revision 696. The access control revision 696 may revise access control of a system according to policies based on risks and/or corresponding countermeasures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for facilitating a maintenance of an access control system for controlling access to one or more resources of an information technology system by one or more subjects according to corresponding access control information, wherein the method comprises:

retrieving, by the control computing system, one or more trigger policies each based on one or more policy parameters, the one or more policy parameters of the one or more trigger policies comprising one or more state parameters relating to a current state of the access control system and one or more security parameters relating to one or more risks of the access control system and one or more countermeasures for mitigating the risks;

wherein each of the one or more risks of the access control system comprises an entry identifying an asset and an entry identifying a specific risk, wherein each entry identifying the asset comprises an asset value defined by an estimated number of employee hours required to recover from an occurrence of the specific risk and an estimated processing power required to recover from the occurrence of the specific risk, wherein each entry identifying the specific risk comprises a role causing the specific risk and a list of one or more assets damaged by the occurrence of the specific risk;

wherein the one or more countermeasures for mitigating the specific risk comprises actions taken to reduce a probability and threat of the one or more risks and an associated cost, wherein the one or more countermeasures for mitigating the specific risk comprises audits, procedures for handling exceptions and transfers of risks to third parties;

retrieving, by the control computing system, the one or more policy parameters;

evaluating, by the control computing system, the one or more trigger policies according to the corresponding retrieved one or more policy parameters;

determining, by the control computing system, a trigger indicator according to a result of the evaluated one or more trigger policies;

storing, by the control computing system, the historical information comprising an indication of one or more affected control items contributing to define the access control information being affected by the revision;

determining, by the control computing system, corresponding impact indicators of the affected control items, wherein the impact indicator of each of the affected control items is based on a number of risks caused by the affected control item, a qualitative level of the impact of each of the number of risks caused by the impacted control item ranging from 0 to 1, an exposure factor of each of number of the risks caused by the impacted control item, a value of each asset impacted by each of the number of risks caused by the impacted control item, and a total value of all assets of the access control system; and outputting, by the control computing system, an indication of the trigger indicator to trigger a revision of the access control system in response thereto, the revision comprising a mining activity for mapping the subjects to the resources and a possible update of the access control information based on a result of the mining activity.

2. The method according to claim 1, further comprising: performing the mining activity in response to the trigger indicator having a positive value indicative of a need of the revision.

3. The method according to claim 2, further comprising: updating the access control information according to the result of the mining activity.

4. The method according to claim 1, wherein the state parameters relate to the resources, the subjects and one or more permissions being granted by the access control system, each for performing one or more activities on one or more of the resources by one or more of the subjects.

5. The method according to claim 1, wherein the access control information comprises an indication of one or more roles, each having one or more permissions each for performing one or more activities on one or more of the resources, and an indication of one or more of the roles assigned to each of the subjects, the mining activity being a role mining.

6. The method according to claim 1, wherein the access control information comprises one or more rules each based on one or more attributes and indicating at least one permission for performing at least one activity on at least one of the resources when the rule is satisfied, the mining activity being a rule mining.

7. The method according to claim 1, further comprising: determining, by the control computing system, the trigger indicator according to corresponding weights assigned to the trigger policies.

8. The method according to claim 7, further comprising: storing, by the control computing system, historical information indicative of at least one occurrence of the revision and of relevant one or more of the trigger policies contributing to trigger the revision; and updating, by the control computing system, the corresponding weights of the relevant trigger policies according to the historical information and to the access control system at a ranking time following the revision.

9. The method according to claim 8, further comprising: updating, by the control computing system, the weights of the relevant trigger policies according to the affected control items at the ranking time.

10. The method according to claim 9, further comprising: determining, by the control computing system, corresponding cost indicators of the affected control items, the cost indicator of each of the affected control items being based on the countermeasures for mitigating the risks caused by the affected control item at the ranking time; and updating, by the control computing system, the weights of the relevant trigger policies according to the cost indicators of the affected control items.

11. The method according to claim 10, further comprising:
calculating, by the control computing system, the cost indicator of each of the affected control items according to the subjects corresponding to the affected control item and to corresponding costs of the countermeasures for mitigating the risks caused by the affected control item pertaining thereto.

12. The method according to claim 9, further comprising: updating, by the control computing system, the weights of the relevant trigger policies according to the impact indicators of the affected control items.

13. The method according to claim 12, further comprising:
calculating, by the control computing system, the impact indicator of each of the affected control items according to corresponding exposure factors of the risks caused by the affected control item and to corresponding values of one or more assets of the information technology system being affected by the risks caused by the affected control item.

14. The method according to claim 9, further comprising: determining, by the control computing system, corresponding scope indicators of the affected control items at the ranking time, the scope indicator of each of the affected control items being based on the subjects corresponding to the affected control item and on one or more permissions given by the affected control item each for performing one or more activities on one or more of the resources; and updating, by the control computing system, the weights of the relevant trigger policies according to the scope indicators of the affected control items.

15. The method according to claim 9, further comprising:
determining, by the control computing system, corresponding lifetime indicators of the affected control items at the ranking time; and
updating, by the control computing system, the weights of the relevant trigger policies according to the lifetime indicators of the affected control items.

16. The method according to claim 1, wherein conditioning one or more of the trigger policies comprises an indication of one or more evaluation conditions, the method further comprising:
conditioning, by the control computing system, the evaluated one or more trigger policies on the corresponding evaluation conditions.

17. The method according to claim 16, wherein
at least one of the evaluation conditions is a completion of a corresponding conditioning task.

18. A method for facilitating a maintenance of an access control system for controlling access to one or more resources of an information technology system by one or more subjects according to corresponding access control information, wherein the method comprises:
retrieving, by the control computing system, one or more trigger policies each based on one or more policy parameters, the one or more policy parameters of the one or more trigger policies comprising one or more state parameters relating to a current state of the access control system and one or more security parameters relating to one or more risks of the access control system and one or more countermeasures for mitigating the risks;
wherein each of the one or more risks of the access control system comprises an entry identifying an asset and an entry identifying a specific risk,
wherein each entry identifying the asset comprises an asset value defined by an estimated number of employee hours required to recover from an occurrence of the specific risk and an estimated processing power required to recover from the occurrence of the specific risk,
wherein each entry identifying the specific risk comprises a role causing the specific risk and a list of one or more assets damaged by the occurrence of the specific risk;
retrieving, by the control computing system, the one or more policy parameters;
evaluating, by the control computing system, the one or more trigger policies according to the corresponding retrieved one or more policy parameters;
determining, by the control computing system, a trigger indicator according to a result of the evaluated one or more trigger policies;
storing, by the control computing system, the historical information comprising an indication of one or more affected control items contributing to define the access control information being affected by the revision;
determining, by the control computing system, corresponding impact indicators of the affected control items, wherein the impact indicator of each of the affected control items is based on a number of risks caused by the affected control item, a qualitative level of the impact of each of the number of risks caused by the impacted control item ranging from 0 to 1, an exposure factor of each of number of the risks caused by the impacted control item, a value of each asset impacted by each of the number of risks caused by the impacted control item, and a total value of all assets of the access control system; and
outputting, by the control computing system, an indication of the trigger indicator to trigger a revision of the access control system in response thereto, the revision comprising a mining activity for mapping the subjects to the resources and a possible update of the access control information based on a result of the mining activity.

19. A method for facilitating a maintenance of an access control system for controlling access to one or more resources of an information technology system by one or more subjects according to corresponding access control information, wherein the method comprises:
retrieving, by the control computing system, one or more trigger policies each based on one or more policy parameters, the one or more policy parameters of the one or more trigger policies comprising one or more state parameters relating to a current state of the access control system and one or more security parameters relating to one or more risks of the access control system and one or more countermeasures for mitigating the risks;
retrieving, by the control computing system, the one or more policy parameters;
evaluating, by the control computing system, the one or more trigger policies according to the corresponding retrieved one or more policy parameters;
determining, by the control computing system, a trigger indicator according to a result of the evaluated one or more trigger policies;
storing, by the control computing system, the historical information comprising an indication of one or more affected control items contributing to define the access control information being affected by the revision;
determining, by the control computing system, corresponding impact indicators of the affected control items, wherein the impact indicator of each of the affected control items is based on a number of risks caused by the affected control item, a qualitative level of the impact of each of the number of risks caused by the impacted control item ranging from 0 to 1, an exposure factor of each of number of the risks caused by the impacted control item, a value of each asset impacted by each of the number of risks caused by the impacted control item, and a total value of all assets of the access control system; and
outputting, by the control computing system, an indication of the trigger indicator to trigger a revision of the access control system in response thereto, the revision comprising a mining activity for mapping the subjects to the resources and a possible update of the access control information based on a result of the mining activity.

* * * * *